(12) United States Patent
Chintala et al.

(10) Patent No.: US 11,081,125 B2
(45) Date of Patent: Aug. 3, 2021

(54) NOISE CANCELLATION IN VOICE COMMUNICATION SYSTEMS

(71) Applicant: Sandeep Kumar Chintala, London (GB)

(72) Inventors: Sandeep Kumar Chintala, London (GB); Sriranjan Rasakatla, Hyderabad (IN)

(*) Notice: Subject to any disclaimer, the term of this patent is extended or adjusted under 35 U.S.C. 154(b) by 48 days.

(21) Appl. No.: 16/621,903

(22) PCT Filed: Jun. 8, 2018

(86) PCT No.: PCT/GB2018/051575
§ 371 (c)(1),
(2) Date: Dec. 12, 2019

(87) PCT Pub. No.: WO2018/229464
PCT Pub. Date: Dec. 20, 2018

(65) Prior Publication Data
US 2020/0126581 A1    Apr. 23, 2020

(30) Foreign Application Priority Data
Jun. 13, 2017    (IN) .............................. 201741020677

(51) Int. Cl.
*G10L 21/00*      (2013.01)
*G06F 3/00*       (2006.01)
(Continued)

(52) U.S. Cl.
CPC ............ *G10L 21/0264* (2013.01); *G01S 3/86* (2013.01); *G10K 11/175* (2013.01); *G10L 21/0308* (2013.01); *G10L 2021/02165* (2013.01)

(58) Field of Classification Search
CPC .......... G10L 21/00; G06F 3/165; G06F 16/06
See application file for complete search history.

(56) References Cited

U.S. PATENT DOCUMENTS 9,311,928 B1     4/2016  Avargel et al.
2009/0089054 A1  4/2009  Wang et al.
(Continued)

OTHER PUBLICATIONS

International Search Report, dated Sep. 17, 2018 (PCT/GB2018/051575).
(Continued)

*Primary Examiner* — Shreyans A Patel
(74) *Attorney, Agent, or Firm* — Robert L. Stearns; Dickinson Wright, PLLC

(57) ABSTRACT

A voice communication system (100) is described. The voice communication system (100) may include an audio engine (112) and a mapping engine (114). The audio engine (112) may cancel ambient noise from a plurality of acoustic signals, to obtain a first set of signals. Further, the audio engine (112) may determine a number of acoustic signals in the first set of acoustic signals and a number of sound sources pertaining to the first set of acoustic signals. The mapping engine (114) may suppress noise from each of the first set of acoustic signals to obtain a noise free set of acoustic signals. In addition, the mapping engine (114) may identify a primary acoustic signal from amongst the noise free set of acoustic signals by mapping each noise free acoustic signal to a corresponding sound source.

14 Claims, 5 Drawing Sheets

(51) Int. Cl.
*G06F 16/60* (2019.01)
*G10L 21/0264* (2013.01)
*G01S 3/86* (2006.01)
*G10K 11/175* (2006.01)
*G10L 21/0308* (2013.01)
*G10L 21/0216* (2013.01)

(56) References Cited

U.S. PATENT DOCUMENTS

| | | | |
|---|---|---|---|
| 2011/0160883 A1* | 6/2011 | Yasuda | G06F 16/60 700/94 |
| 2012/0076316 A1* | 3/2012 | Zhu | G01S 3/801 381/71.11 |
| 2012/0249785 A1* | 10/2012 | Sudo | H04R 1/406 348/143 |
| 2015/0003637 A1* | 1/2015 | Chen | H03G 1/02 381/122 |
| 2015/0222755 A1 | 8/2015 | Chintala | |
| 2018/0350381 A1* | 12/2018 | Bryan | G10L 21/0272 |
| 2020/0126581 A1* | 4/2020 | Chintala | G01S 3/86 |

OTHER PUBLICATIONS

Choi S et al, "Blind Source Separation and Independent Component Analysis: A Review". Neural Information Processing—Letters and Rev, Kaist Press, Daejeon, KR, vol. 6, No. 1. Jan. 2005 (Jan. 2005), pp. 1-57, XP008048911, ISSN: 1738-2572, p. 2, paragraph 1.-p. 8, paragraph 2.1; figure 4, p. 16, paragraph 4.-p. 17.

Anonymous: "Processor SDK RTOS Audio Pre-Processing—Texas Instruments Wiki", May 16, 2017 (May 16, 2017), XP055504123, Retrieved from the Internet: URL:https://web.archive.org/web/20170516082308/http://processors.wiki.ti.com/index.php/Processor_SDK_RTOS_Audio_Pre-Processing [retrieved on Jan. 16, 2020], p. 1, paragraph Introduction-p. 2; figure p. 2.

Daniele Salvati et al: "Improvement of acoustic localization using a short time spectral attenuation with a novel suppression rule", Proc. of the 12 th Int. Conference on Digital Audio Effects (DAFX-09), Sep. 1, 2009 (Sep. 1, 2009), pp. 1-7, XP055503581, Como, Italy, DOI: 10.13140/RG.2.2.27276.92803, p. 1, paragraph1.-p. 5, paragraph 3.2; figure 1.

* cited by examiner

NOISE CANCELLATION IN VOICE COMMUNICATION SYSTEMS

TECHNICAL FIELD

The present subject matter relates, in general, to noise cancellation and, in particular but not exclusively, to noise cancellation in voice communication systems.

BACKGROUND

Nowadays voice communication systems, such as mobile phones, cellular phones, smartphones, and personal digital assistants (PDAs), have become ubiquitous. The voice communication systems are used in almost every kind of environments and situations, for example, at workplaces, at markets, at homes, while driving a vehicle, while walking, and so on. Some of the environments may be noisy at times; in other words, may have a high level of ambient noise. Usually, to suppress the ambient noise in such noisy environments, different noise cancellation techniques are employed in the voice communication systems.

BRIEF DESCRIPTION OF DRAWINGS

The following detailed description references the drawings, wherein.

DETAILED DESCRIPTION

Figure 1:
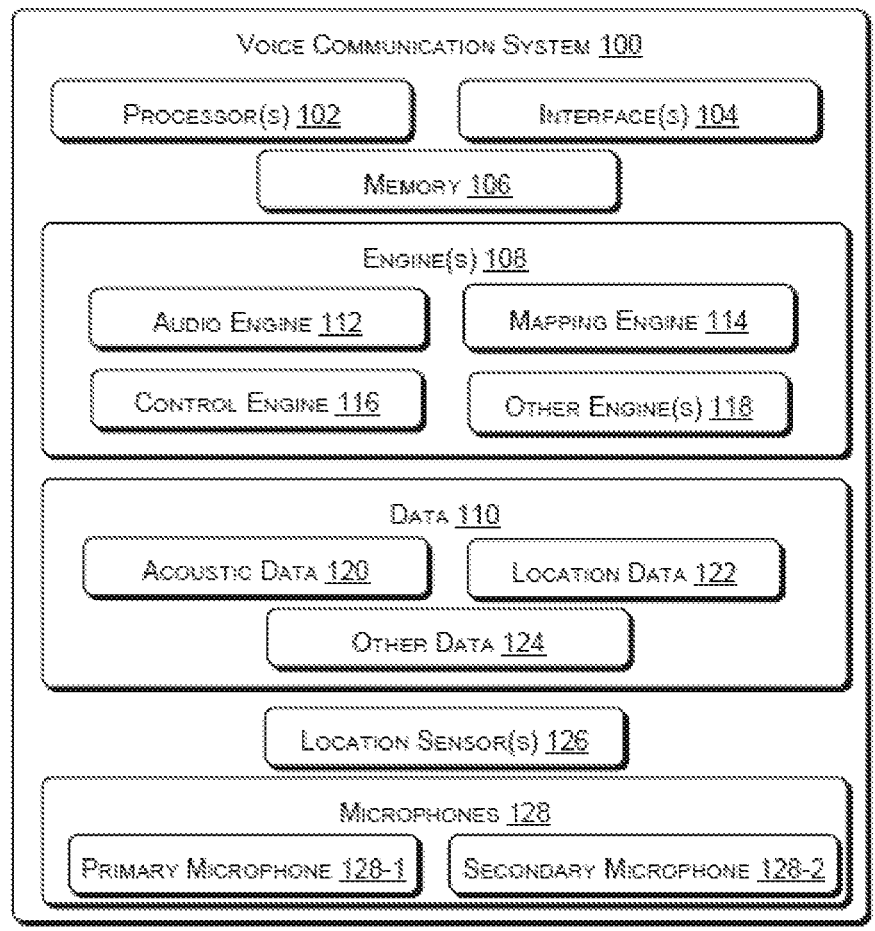
FIG. 1 illustrates a block diagram of a voice communication system, according to an example implementation of the present subject matter.

The voice communication systems with a single microphone does not work effectively because the microphone captures various acoustic signals that may be originating from different sound sources. These acoustic signals include an acoustic signal of interest (hereinafter referred to as a primary acoustic signal) as well as ambient noise. For example, when distance between a speaker and the microphone is more, more ambient acoustic signals may be captured by the microphone. Therefore, existing voice communication systems, such as mobile systems, that employ single microphone, when used in environments having high levels of ambient noise, does not offer a pleasant communication experience.

As a result, to suppress the ambient acoustic signals from the primary acoustic signal, various noise cancellation techniques are implemented in the voice communication systems. Conventional techniques for noise cancellation typically involve subtracting the ambient noise from the acoustic signals captured by the microphone to suppress the noise. However, the conventional techniques are unable to determine which is the primary acoustic signal in the acoustic signals captured by the microphone. The lack such determination renders the conventional techniques ineffective in separating the acoustic signal of interest from the ambient noise.

In order to separately identify the primary acoustic signal from amongst the multiple acoustic signals, the conventional techniques necessitate that each sound source be associated with a different microphone. However, if the number of sound sources exceed the number of microphones, the conventional techniques do not provide a desired quality of the acoustic signal. Moreover, employing separate microphones to capture the acoustic signals coming from separate sound sources may not be feasible, especially when there are multiple sound sources. Besides, even with separate microphones, the conventional techniques are unable to process such an acoustic signal which is composed of multiple sounds.

Approaches for identifying a primary acoustic signal from a plurality of acoustic signals, are described herein. The present subject matter describes a voice communication system that employs two-stage noise cancellation and two-stage localization to identify the primary acoustic signal. In an example, the primary acoustic signal may be identified from the plurality of acoustic signals captured by at least two microphones.

In an example, the present subject matter may include a primary microphone and a secondary microphone, to capture the plurality of acoustic signals. The plurality of acoustic signals may include the primary acoustic signal, such as a voice of a primary speaker, captured by the primary microphone and ambient noise captured by the secondary microphone. In an example, the ambient noise may be considered as any sound other than the primary acoustic signal.

In an implementation, the present subject matter may subject the plurality of acoustic signals to a first stage of noise cancellation to obtain a first set of acoustic signals. For example, acoustic signals captured from the secondary microphone from the acoustic signals captured by the primary microphone, to obtain the first set of acoustic signals. Thereafter, a cross-correlation based localization is performed to determine a number of acoustic signals in the first set of acoustic signals. In addition, the cross-correlation based localization facilitates in determining geometric locations of sound sources associated with each of the acoustic signals in the first set of acoustic signal.

Upon determination of the number of acoustic signals and the number of geometric locations, each acoustic signal from the first set of acoustic signals is separated. Thereafter, a second stage noise cancellation may be performed to suppress noise from each of the separated acoustic signals to obtain a noise free set of acoustic signals. Each noise free acoustic signal may be mapped to a corresponding sound source using cross-correlation, to identify the primary acoustic signal.

Once the primary acoustic signal, the voice communication system may auto-mute the remaining acoustic signals during a communication. For example, when the primary speaker is speaking, microphones for capturing the acoustic signals pertaining to other speakers are muted.

Accordingly, the present subject matter identifies sound source for each of the plurality of acoustic signals even in absence of separate microphones for each acoustic signal. This provides an ease of implementation of the present subject matter in various voice communication systems.

Further, the two-stage noise cancellation enhances the quality of the primary acoustic signal. In addition, the two-stage cross-correlation facilitates in accurately identifying a location of the sound source.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a voice communication system 100 (hereinafter referred to as system 100), according to an example implementation of the present subject matter. The system 100 may be implemented as a communication device, such as a mobile phone, a cellular phone, a tablet, a smartphone, a Personal Digital Assistant, and the like. In one implementation, the system 100 includes a processor(s) 102, interface(s) 104, and memory 106 coupled to the processor(s) 102. The processor(s) 102 may be implemented as one or more microprocessors, microcomputers, microcontrollers, digital signal processors, central processing units, state machines, logic circuitries, and/or any systems that manipulate signals based on operational instructions. Among other capabilities, the processor(s) 102 may be configured to fetch and execute computer-readable instructions stored in the memory 106.

The memory 106 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 104 may include a variety of software and hardware interfaces, for example, interfaces for peripheral system(s), such as a product board, a mouse, an external memory, and a printer. Additionally, the interface(s) 104 may enable the system 100 to communicate with other systems, such as web servers and external repositories.

The system 100 also includes engine(s) 108 and data 110. The engine(s) 108 include, for example, an audio engine 112, a mapping engine 114, a control engine 116, and other engine(s) 118. The other engine(s) 118 may include programs or coded instructions that supplement applications or functions performed by the system 100. The data 110 may include acoustic data 120, location data 122, and other data 124. Further, the other data 124, amongst other things, may serve as a repository for storing data, which is processed, received, or generated as a result of the execution of one or more modules in the engine(s) 108.

Although the data 110 is shown internal to the system 100, the data 110 can also be implemented external to the system 100, where the data 110 may be stored within a database communicatively coupled to the system 100.

Further, the system 100 may include one or more location sensors, such as location sensors 126. The location sensors 126 facilitate in identifying a position of a speaker. The location sensors 126 also facilitate in assessment of phase of the acoustic signals and a time of arrival of the acoustic signals. In an example, the location sensors 126 may be placed as widely in the system 100 as possible, for enabling accurate determination of the phase and time of arrival of the acoustic signals.

The system 100 may also include microphones 128 for capturing a plurality of acoustic signals. In an example, the microphones 128 may include a primary microphone 128-1 and a secondary microphone 128-2. The primary microphone 128-1 is configured to mainly capture acoustic signals pertaining to a user of the system 100, hereinafter referred to as a primary speaker. The acoustic signals captured by the secondary microphone 128-2 may be considered as the ambient noise.

The location sensors 126 may be placed at such a place in the system 100 so as to enable identifying a location of different sound sources in an accurate manner. For example, the location sensors 126 may be situated adjacent to the microphones 128. In another example, the location sensors 126 may surround the microphones 128.

In an example, the system 100 may be configured to identify the primary acoustic signal from a plurality of acoustic signals based on two-stage noise cancellation and two-stage cross-correlation. Based on the identification of the primary acoustic signal, the system 100 may provide automatic muting capability to the user. In an implementation, the audio engine 112 may receive the plurality of acoustic signals that may be captured by the microphones 128. In an example, the plurality of acoustic signals may include a primary acoustic signal and ambient noise. The primary acoustic signal may be understood as the voice of a user of the system 100. In an example, the primary microphone 128-1 may be configured to capture the primary acoustic signal along with other acoustic signals. In case, where the system 100 is used by one individual for making a call, that individual may be referred to as the primary speaker. The acoustic signals captured by the secondary microphone 128-2 may be considered to be the ambient noise.

In cases where more than one individuals are using the system 100 for making a call, such as a conference call, an individual speaking first may be considered as the primary speaker and the acoustic signals received from other individuals as well as from the surroundings may be considered as the ambient noise.

Once the plurality of acoustic signals is received by the audio engine 112, the audio engine 112 may filter the plurality of acoustic signals based on an amplitude associated with the plurality of acoustic signals. In an example, during the filtering, the audio engine 112 may remove all acoustic signals that may have an amplitude below a predefined threshold value. For example, acoustic signals received from a distant sound source may have a low amplitude and may not be audible. The audio engine 112 may accordingly filter out such acoustic signals from the plurality of acoustic signals.

In an example, the audio engine 112 may employ a three-level amplitude filter which may be adaptive to the amplitude of the primary speaker's voice. In case of the three-level amplitude filtration, the audio engine 112 may define three thresholds, for example, a low threshold, a medium threshold, and a high threshold. Thereafter, the audio engine 112 may determine an amplitude of the acoustic signals. Based on the amplitude of the acoustic signals, the audio engine 112 may filter out certain acoustic signals from the plurality of acoustic signals. For example, if the amplitude of the acoustic signals coming from the primary microphone is about the high threshold, then the audio engine 112 may update a flag count quickly to allow the voice of a speaker. If the amplitude is in the mid threshold, the audio engine 112 may update the flag count at a bit faster speed and if the amplitude is in the low threshold, the audio engine 112 may update the flag count at a fastest speed. The flag is employed to keep a track of when to allow the acoustic signals coming from the primary speaker.

After filtering out some of the acoustic signals, the audio engine 112 may cancel the ambient noise from the plurality of acoustic signals. In an example, the audio engine 112 may subtract the ambient noise from the acoustic signals captured by the primary microphone 128-1 to obtain a first set of acoustic signals. In the present example, the audio engine 112 may employ an Algebraic Aggregator technique for cancelling the noise from the primary acoustic signal. In an example, the Algebraic Aggregator technique uses a signed sum of the audio signals where the ambient noise signal is given a negative sign and the primary acoustic signal is given a positive sign. In an example, the primary acoustic signal is considered to be the acoustic signal coming from the primary microphone 128-1 and is accordingly given a positive sign.

This signed sum of amplitude with a weight factor is used to generate a noise dampened acoustic signals. The first set of acoustic signals may then be processed by the audio engine 112 to determine a number of acoustic signals and a number of sound sources pertaining to the first set of acoustic signals. In an example, a sound source may be indicative of an originating point of an acoustic signal. For instance, the primary speaker may be considered as a sound source. Likewise, a media player, a loudspeaker, other individuals may also be considered as a sound source.

In order to determine the number of sound sources and the number of acoustic signals, the audio engine 112 may apply cross-correlation based localization on the first set of acoustic signals. In an example, the audio engine 112 employs temporal cross-correlation to identify the direction of the sound sources. As a result of the localization, the audio engine 112 may obtain a direction of various sound sources. In an example, the audio engine 112 may obtain X, Y, Z coordinates of each of the sound sources. The coordinates of the sound sources may facilitate in identifying the sound source of the primary acoustic signal. For instance, the sound source that may be nearest to the system 100 may be considered as relating to the primary acoustic signal. The audio engine 112 may store the data pertaining to the first set of acoustic signals, such as the number of acoustic signals and the number of sound sources as the acoustic data 120.

When the number of sound sources and the number of acoustic signals is retrieved by the audio engine 112, the system 100 determines which acoustic signal corresponds to which sound source. In order to relate the sound sources and the acoustic signals, the mapping engine 114 may separate each of the first set of acoustic signals. In an example, the mapping engine 114 may employ an Independent Component Analysis (ICA) technique for separating each acoustic signal from the first set of acoustic signals. The ICA technique facilitates in separation of independent acoustic signals that are linearly mixed.

After separation, the mapping engine 114 may suppress noise from each of the first set of acoustic signals to obtain a noise free set of acoustic signals. It may be noted that each acoustic signal from amongst the first set of acoustic signals undergoes noise cancellation for a second time. This facilitates in obtaining acoustic signals with enhanced quality. Further, when the quality of acoustic signals is enhanced, the sound source corresponding to each acoustic signal can be identified with accuracy. In an example, the mapping engine 114 may employ the algebraic aggregator technique for suppressing the noise from each separated acoustic signal. As mentioned above, the noise free set of acoustic signals may be understood as a set of acoustic signals with enhanced quality. The second stage of noise cancellation eliminates the remnant effects of different sound sources in each of the separated acoustic signal.

In an implementation, the mapping engine 114 may identify a primary acoustic signal from amongst the noise free set of acoustic signals by mapping each noise free acoustic signal to a corresponding sound source. To do so, the mapping engine 114 may geometrically separate the sound sources by performing a cross-correlation based localization. Based on the localization, the mapping engine 114 may identify and correspond which noise free acoustic signal belong to which sound source. In an example, the mapping engine 114 may correspond the primary acoustic signal to the primary speaker.

The voice communication system as described so far enables in identifying different sound sources even with two microphones. The voice communication system further separates those acoustic signals which are composed of multiple sounds. Further, the two-stage noise cancellation facilitates in eliminating remnant effects of other sources in each acoustic signal. In addition, geometrically separating the sound sources using two-stage cross correlation facilitates in accurately identifying the sound source associated with each acoustic signal.

In an example, the system 100 may be coupled to a database (not shown) through a network. The database may be directly connected to the system 100. In an implementation, the database may store information, such as noise free set of acoustic signals, different sources pertaining to different acoustic signals, and the like. The information stored in the database may be employed for carrying out further analysis, such as identifying an identity of a speaker, time of use of the system 100, frequency of use, location of use, and the like. In an example, the analysis of the information pertaining to the acoustic signals may be utilized for security authentication and communicating with banking systems, consumer electronic devices, connected and/or autonomous vehicle, personal/Artificial Intelligence assistants, and the like. In an example, in case of banking systems, the information may be used for logging into banking, making payments, adding or removing new payees using voice authentication.

In another embodiment, the system 100 facilitates in identifying the primary speaker based on a position and sound characteristics pertaining to each acoustic signal. In the present embodiment, the audio engine 112 may be configured to identify a position and direction of the sound sources. For example, in case of an audio call, the audio engine 112 may identify the position and direction of the sound sources participating in the call. Examples of the sound sources may include, but are not limited to, an individual, a vehicle, and other ambient sources.

As described earlier, the audio engine 112 may receive the plurality of acoustic signals from the microphones 128. In an implementation, the audio engine 112 may analyze the acoustic signals to identify the primary speaker from other sound sources. For example, the audio engine 112 may identify the primary speaker based on a distance between a sound source and the system 100 and an amplitude of the acoustic signals received. Further, the audio engine 112 may store information pertaining to the location of the sound sources as the location data 122. Details pertaining to determination of position and location of the sound sources by the audio engine 112 will be explained in conjunction with FIG. 2.

In an implementation, the system 100 may be configured to perform a speech to text conversion of the primary acoustic signal as identified above. In an example, the system 100 may employ different conversion techniques for converting the speech into text. The text may then be stored in the system 100 in data 110. In an example, the system 100 may identify voices of multiple primary speakers when the speakers are using 4 primary microphones. Further, the system 100 may parallelly convert speech or voice signals from multiple speakers into text.

In an implementation, the primary acoustic signal as identified by the system 100 may be utilized for providing an automatic muting functionality during an audio call. To do so, the control engine 116 receives the noise free acoustic signals as an input from the mapping engine 114 and processes the noise free acoustic signals to identify sound characteristics associated with each of the acoustic signals. In the present implementation, the control engine 116 may perform a spectral analysis on the noise free acoustic signals to distinguish voice signals from the ambient noise. In an example, the sound characteristics may include, but are not limited to, a pitch of the acoustic signals, a frequency of the acoustic signals, a time of arrival of the acoustic signals, a phase of the acoustic signals, and an amplitude of the acoustic signals.

Based on the sound characteristics and the position of the sound sources, the control engine 116 may determine when is the primary speaker speaking during a call. In an example, the acoustic signals captured by the primary microphone 128-1 may be considered to be coming from the primary speaker. As described above, a direction of the acoustic signals as well as an amplitude thereof may be used to determine when the primary speaker is speaking. For instance, when the acoustic signals have an amplitude of about 2500-4096 ADC values, it is considered that the primary speaker is speaking.

For example, the control engine 116 may activate or de-activate the automatic call muting functionality based on detection or non-detection of a voice signal from the system 100. For example, the control engine 116 may automatically unmute the communication device to provide audio signals to the call when the primary speaker is speaking. Further, the control engine 116 may automatically mute the communication device of the primary speaker to block audio signals when the primary speaker is not speaking. Details pertaining to automatic muting by the control engine 116 will be explained in conjunction with FIG. 3.

In an implementation, a user may select whether or not the automatic call muting functionality is to be activated in the system 100. In an example, the user may activate or deactivate the call muting functionality by either pressing a key in the communication device or through an application or voice setting in the communication device. In addition, the system 100 facilitates the user to select when to activate the automatic call muting functionality. In the present implementation, the control engine 116 may enable the user to activate or deactivate the automatic call muting functionality. In one example, the user may choose to have the automatic call muting functionality activated by default for every communication. In another example, the user may choose to activate the automatic call muting functionality for selected communications, such as while answering a call or after answering the call.

Furthermore, the processor 102 of the system 100 may utilize a voice recognition engine (not shown) to manage calls by defining specific voice commands. For example, the user may define certain voice commands to handle the calls when the incoming calls are received from a particular name, a particular number, a particular time, and so on. The voice commands facilitate the user to accept, reject, ignore, or end a call. In an example, the voice commands may be sent to a communication device, via a Bluetooth® audio link of the communication device.

The automatic call muting functionality as provided by the present subject matter facilitates in removing any unwanted sound during an audio call, such as a conference call. The mapping of the acoustic signals with the sound sources facilitates in accurate identification of a particular speaker and thus muting remaining communication systems.

In an implementation, the automatic call muting functionality may be employed in vehicles, such as a car, a jeep, a bike, a motorcycle, and the like. For capturing clear voice signals and to provide ease in communication in cars, the microphones 128, especially the primary microphone 128-1 may be mounted within a rearview mirror of a vehicle. In another example, the microphones 128 may be mounted near a driver's head to enable clearly capturing voice signals from the speakers. In case of two-wheelers, such as a motorcycle, the microphones 128 may be mounted within a helmet of a rider. In an example, the primary microphone 128-1 may be positioned near a rider's mouth and the secondary microphone 128-2 may be positioned in other parts of the helmet. In the present scenario, the driver or rider may be considered as the primary speaker.

Accordingly, the microphones 128 may be configured to capture the acoustic signals coming from the direction of the driver. The audio engine 112 may thereafter suppress ambient noise from the acoustic signals and filter the acoustic signals to reject the voice coming from other directions. In an example, the audio engine 112 may filter the plurality of acoustic signals based on an amplitude associated with the plurality of acoustic signals. As a result, the audio engine 112 rejects noises coming from other sources, such as a car horn or vehicular engine noise. Thereafter, the mapping engine 114 may further suppress noise from the filtered acoustic signals.

Figure 2:
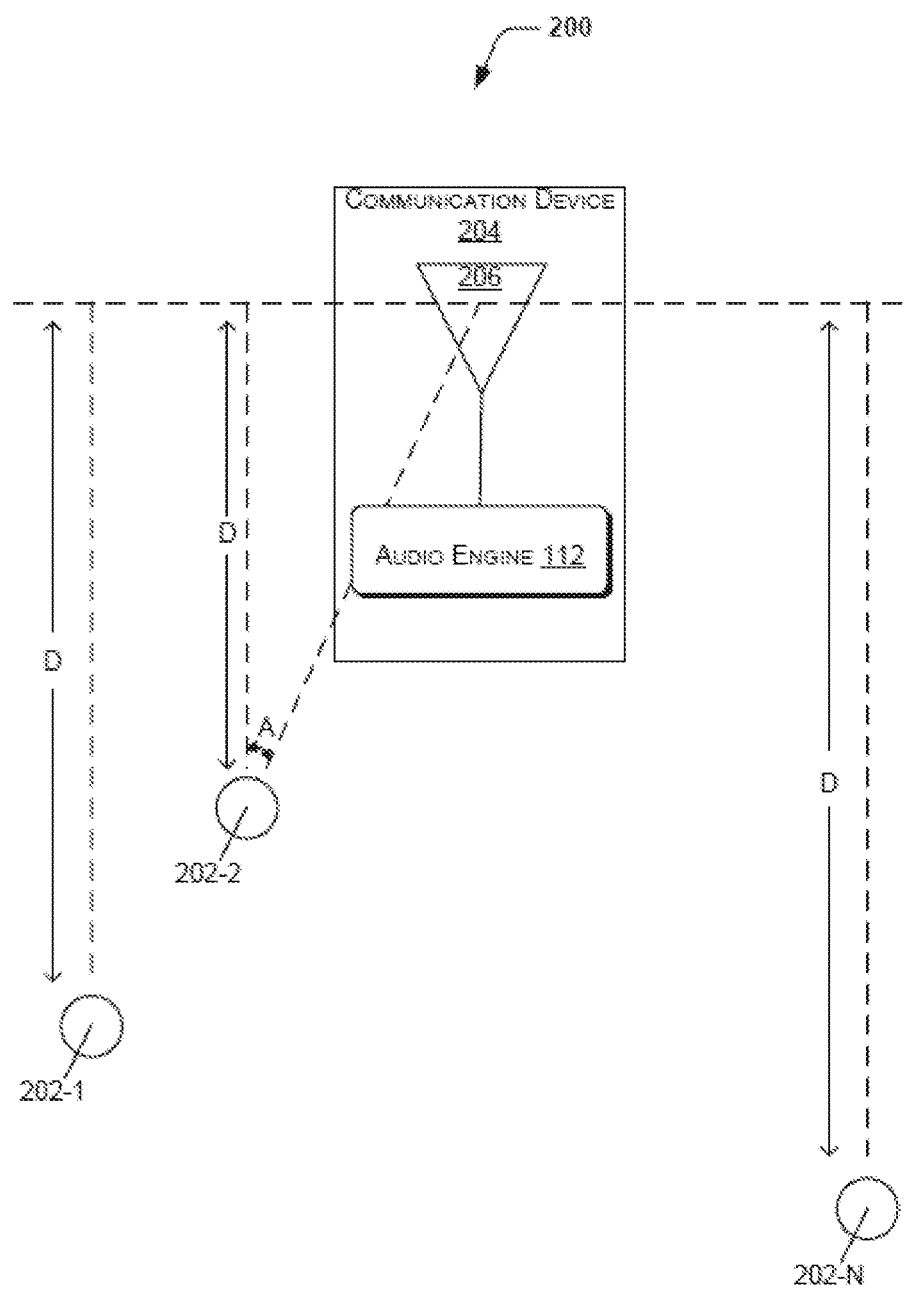
FIG. 2 illustrates a block diagram of a voice communication system for identifying a position and sound characteristics of a speaker, according to an example implementation of the present subject matter.

FIG. 2 illustrates a block diagram 200 of a voice communication system 100 (hereinafter referred to as system 100) for identifying a position and sound characteristics of a speaker 202, according to an example implementation of the present subject matter. The system 100 may be implemented as a communication device 204, such as a mobile phone, a tablet, a smartphone, a Personal Digital Assistant (PDA), and the like.

In an implementation, the communication device 204 may include at least one audio sensor 206. The audio sensor 206 may be configured to sense the sounds generated near the communication device 204, during the audio call. The audio sensor 206 may input the acoustic signals to the audio engine 112. In an example, the audio sensor 206 may not only capture sounds pertaining to individuals, but also other sounds that may help in identifying a direction, range, and nature of sounds in relation to the communication device 204.

In an example, based on the input received, the audio engine 112 may determine whether or not the acoustic signals from the audio sensor 206 are to be provided as a contribution to an ongoing audio call. To do so, the audio engine 112 may first deduce a position of a plurality of speakers 202-1, 202-2, ... 202-N, collectively referred to as speakers 202 and individually referred to as a speaker 202. In order to deduce the position of the speakers 202, the audio engine 112 may use at least one of a time of arrival of sound from the speaker 202, a phase of sound received from the speaker 202, or a loudness of sound received from the speaker 202.

Based on the above parameters, the audio engine 112 may measure a distance (D) and an angle (A) of each speaker 202 (or other sound source) from the audio sensor 206. The audio engine 112 computes the distance along a longitudinal axis normal to a lateral axis of the audio sensor 206 of the communication device 204. Further, the audio engine 112 determines the angle formed between the longitudinal axis passing through the respective individual speaker and a straight line joining the respective individual speaker with the audio sensor 206.

In an example, the distance and angle is determined based on time delay of arrival of the acoustic signals. In an implementation, the time delay may be calculated by the audio engine 112. In an example, the distance and angle may be used for automatic muting to distinguish ranges and direction of the speaker 202 from the communication device 204.

In an implementation, the audio engine 112 further identifies various characteristics associated with acoustic signals being received from the speakers 202. In an example, the audio engine 112 may perform analysis of the acoustic signals, such as a coder and decoder (CODEC) analysis. The CODEC analysis involves identifying features specific to a voice of the primary speaker. To do so, the audio engine 112 may localize the acoustic signals to perform voice recognition, pitch and frequency detector. For example, as the human voice falls into a frequency band of 20 Hz to 20 KHz. The audio engine 112 may involve such parameters during the CODEC analysis, to filter out unwanted noises based on frequency. In an example, the primary speaker may also be identified based on pitch, amplitude and frequency of a particular speaker's voice.

The CODEC analysis may be performed in a manner employed in most mobile telephones, for example, to transmit digital signals and receive audio signal, to determine voice click repetition rate and vocoder filter settings, and the like. In an example, the audio engine 112 may employ some or all of the above measures to determine position and sound characteristics of the speakers 202.

In an example, based on the position and sound characteristics of the speakers 202 as identified by the audio engine 112, the mapping engine 114 may identify the primary speaker. In the present example, the primary speaker may be understood as the speaker who is near to the system 100 and whose voice is captured by the primary microphone 128-1.

Figure 3:
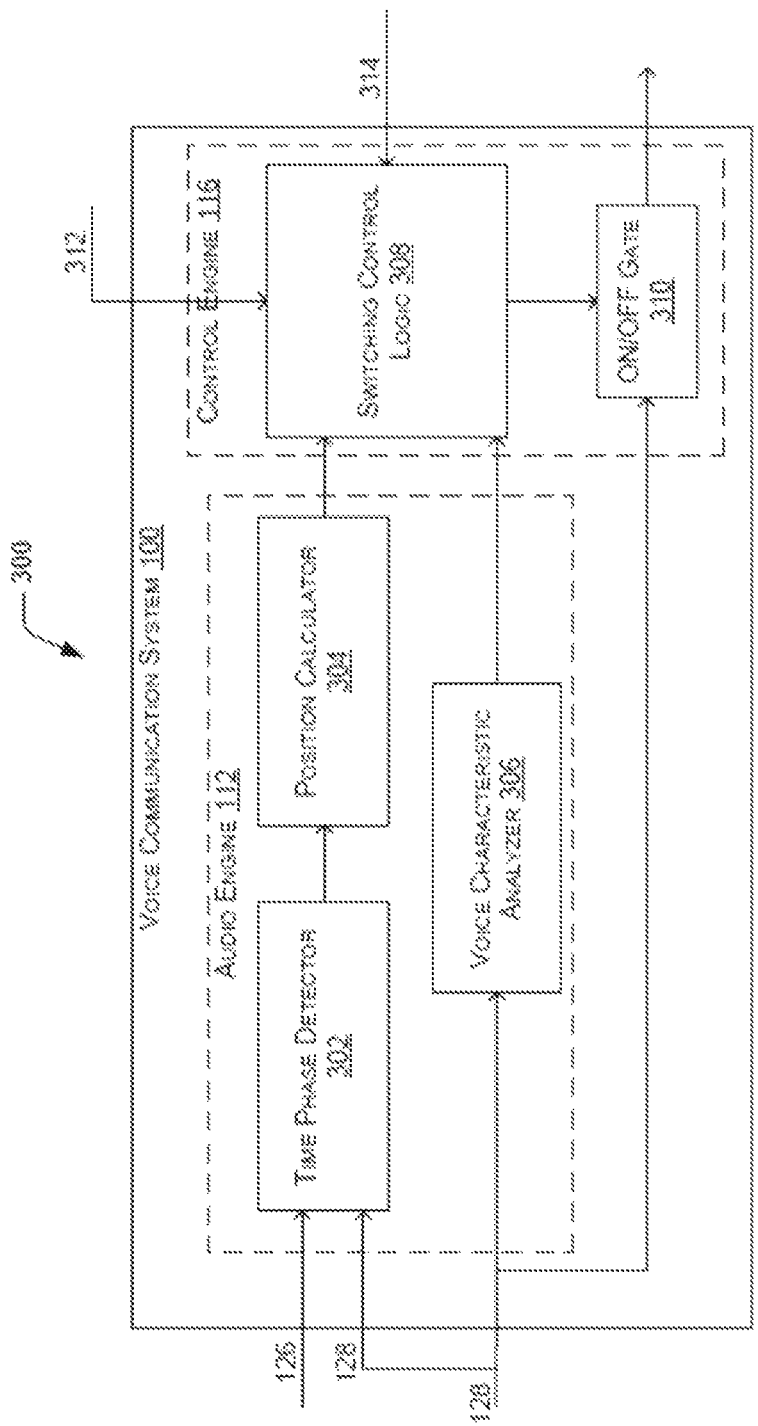
FIG. 3 illustrates another block diagram of a voice communication system, according to an example implementation of the present subject matter.

Reference is now made to FIG. 3 that illustrates another block diagram 300 of a voice communication system 100, according to an example implementation of the present subject matter. The block diagram 300 depicts those elements of the system 100 that facilitate in detection of different sound sources and automatic muting of a call. In an implementation, the audio engine 112 may include a time phase detector 302, a position calculator 304, and a sound analyzer 306. Further, the control engine 116 may include a switching control logic 308 and an ON/OFF gate 310. In operation, the time phase detector 302 may receive input from the location sensor(s) 126. In an example, the time phase detector 302 may also receive input from the microphones 128. Based on the input, the time phase detector 302 may compute a time of arrival of the acoustic signals to the system 100 and a phase of different acoustic signals. In an example, the time of arrival of the acoustic signals and the phase of the acoustic signals may be computed based on temporal cross-correlation.

An output of the time and phase detector 302 is provided as an input to the position calculator 304. Based on the time and phase provided by the time and phase detector 302, the position calculator 304 may identify locations of each sound source or speaker 202. In an example, the position calculator 104 may perform cross-correlation based localization to identify the locations of each sound source or speaker 202. In an example, a default position for a speaker 202 may be considered to be immediately front of the primary microphone 128-1. Once the position of different sound sources is identified, the audio engine 112 may identify sound characteristics of different sound sources or speakers 202.

In this respect, output from the microphones 128 is provided to the sound analyzer 306. The sound analyzer 306 is configured to analyze the acoustic signals to identify the sound characteristics of the sound sources or the speakers 202. In an example, the analysis performed by the sound analyzer 306 may include, but is not limited to, a spectral analysis and a sound CODEC (coder and decoder) analysis. In an example, the spectral analysis is performed using Fast Fourier Transform.

Thereafter, the output from the audio engine 112 is fed to the control engine 116. In other words, the outputs of the position calculator 304 and of the sound analyzer 306 are provided as an input to the switching control logic 308. The switching control logic 308, in turn is configured to drive the ON/OFF gate 310. For example, when the ON/OFF gate 310 is open, the input from the microphones 128 is provided to drive a communication device, such as the communication device 204 in a normal way. On the other hand, when the ON/OFF gate 310 is closed, input from the microphones 128 is blocked from delivery and the communication device 204 is muted.

In an implementation, the communication device 204 delivers a dynamic mute signal 312 to the switching control logic 308 to control whether or not dynamic muting is employed. In an example, dynamic muting indicates that the control engine 116 determines when the speaker is speaking or not. Based on the determining, the control engine 116 may provide the automatic call muting functionality. In case of dynamic muting, a selected speaker from amongst the speakers 202 is allowed to provide an un-muted input. If the dynamic mute signal 312 is not in an active state, the ON/OFF gate 310 is permanently open and all sounds from the speakers 202 may be found on the communication device 204.

In an example, if the dynamic mute signal 312 is in an active state, the ON/OFF gate 310 is open or closed depending upon the location and sound characteristics of the speaker 202. Further, sounds coming from selected speakers 202 is received as an input of the communication device 204.

In an implementation, the control engine 116 facilitates in selecting a particular speaker 202 from amongst the plurality of speakers 202. This may allow in selecting different speakers during an audio call. For example, a speaker selection signal 314 may be provided to the switching control logic 308 to select a particular speaker 202 when that speaker 202 is speaking. In an example, the control engine 116 may geometrically separate different sound sources by using temporal cross-correlation.

In an implementation, the control engine 116 may select the speaker 202 solely on the basis of the positions of the sound sources. In this case, output of the position calculator 304 may be taken into consideration and the output of the sound analyzer 306 may be ignored. In an alternative implementation, the control engine 116 may select the speaker 202 wholly based on the sound characteristics of the speaker 202 and the position of the speaker 202 may be ignored. Accordingly, a speaker 202 may speak on the communication device 204 irrespective of the location of the speaker 202.

It is to be noted that the description of FIG. 3 has been provided as functions that may be performed by a programmable processor operable associated with the voice communication system 100. However, it will be evident that to a person skilled in the art that the description of FIG. 3 may be implemented as a piece of hardware, without departing from the scope of the present subject matter.

Figure 4:
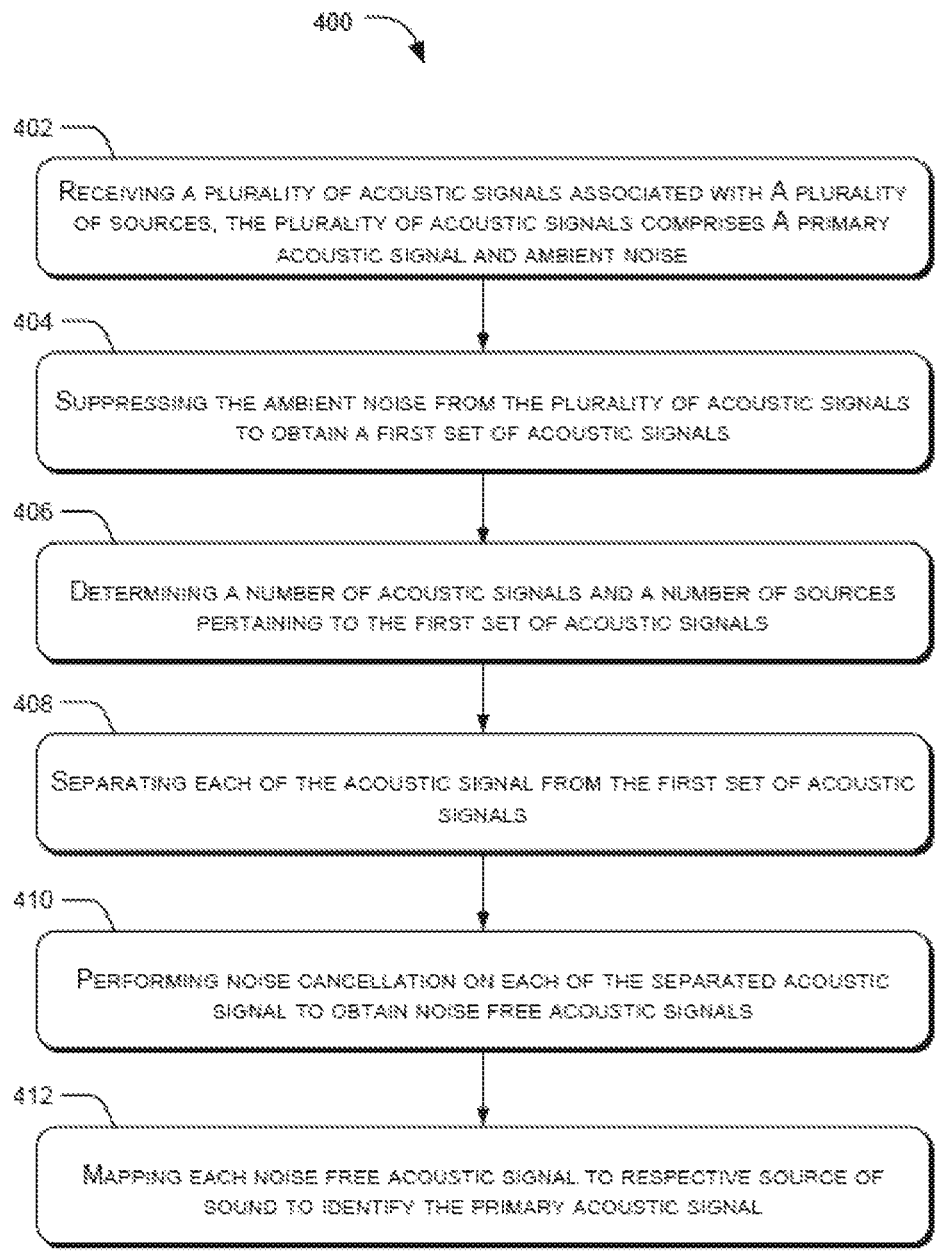
FIG. 4 illustrates a method for identifying a primary acoustic signal from amongst a plurality of acoustic signals, according to an example implementation of the present subject matter.
Figure 5:
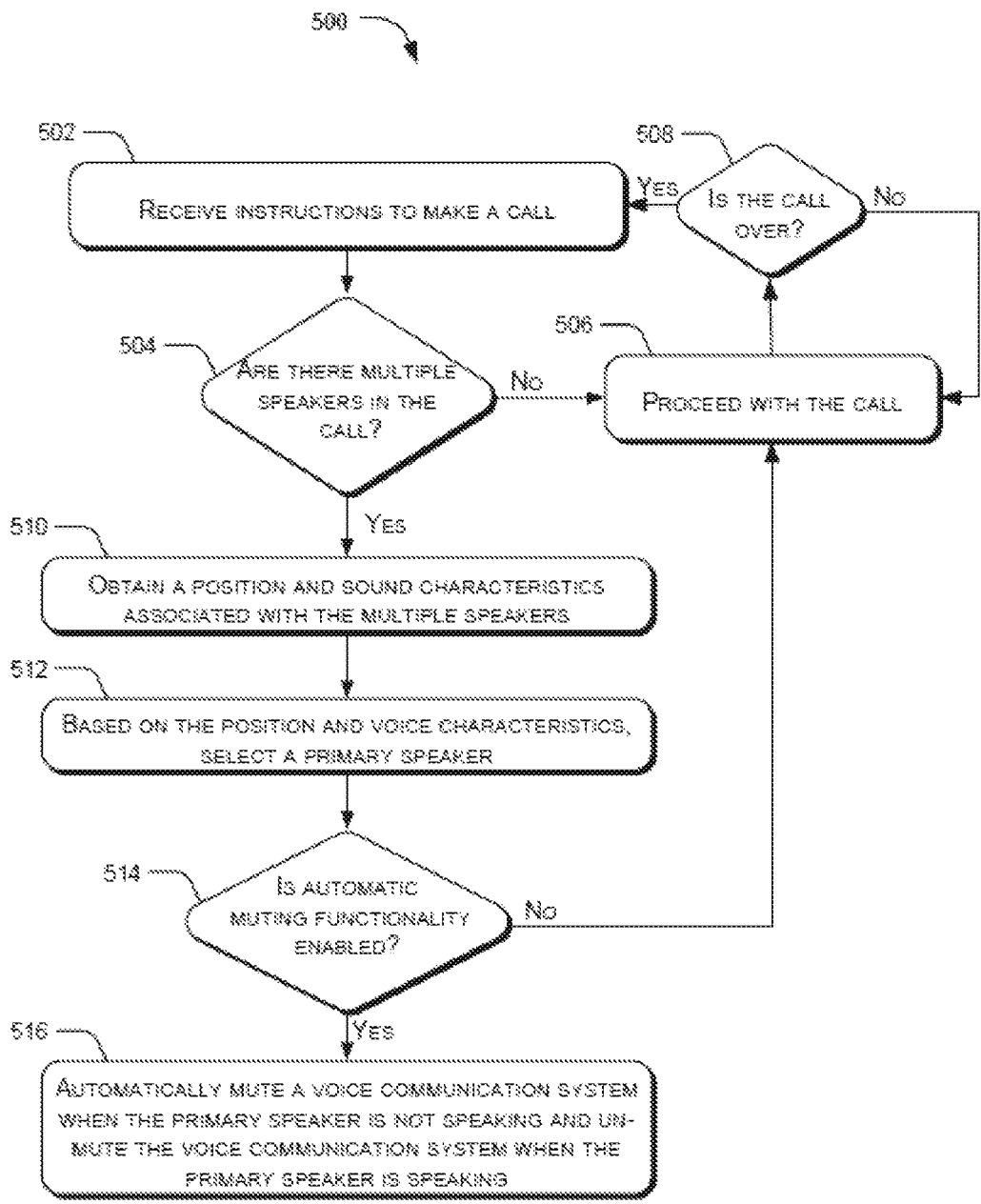
FIG. 5 illustrates a method for implementing an automatic muting functionality in a voice communication system, according to an example implementation of the present subject matter.

FIGS. 4 and 5 illustrate methods 400 and 500 for identifying a primary acoustic signal from amongst a plurality of acoustic signals and for implementing an automatic muting functionality in a voice communication system 100, respectively, according to example implementations of the present subject matter. The order in which the methods 400 and 500 are described is not intended to be construed as a limitation, and some of the described method blocks can be combined in a different order to implement the methods 400 and 500, or an alternative method. Additionally, individual blocks may be deleted from the methods 400 and 500 without departing from the subject matter described herein. Furthermore, the methods 400 and 500 may be implemented in any suitable hardware, firmware, computer-readable instructions, or combination thereof.

At block 402, the method 400 may include receiving a plurality of acoustic signals associated with a plurality of sound sources. The plurality of acoustic signals may include a primary acoustic signal and ambient noise. In an implementation, the audio engine 112 may receive the plurality of acoustic signals. In an example, the plurality of acoustic signals is received from the microphones 128, such as the primary microphone 128-1 and the secondary microphone 128-2.

At block 404, the method 400 may include suppressing the ambient noise from the plurality of acoustic signals to obtain a first set of acoustic signals. In an implementation, the audio engine 112 may suppress the ambient noise from the plurality of acoustic signals. In an example, the audio engine 112 may employ an algebric aggregator technique to suppress the noise from the plurality of acoustic signals.

At block 406, the method 400 may include determining a number of acoustic signals and a number of sources pertaining to the first set of acoustic signals. A sound source may be understood as an origin of an acoustic signal. In an implementation, the audio engine 112 may determine the number of acoustic signals and the number of source by performing source localization.

At block 408, the method 400 may include separating each of the acoustic signal from the first set of acoustic signals. In an implementation, the mapping engine 114 may separate each of the acoustic signal from the first set of acoustic signals. In an example, separating the acoustic signals may include identifying a number of sources of the acoustic signals and location coordinates of the sources of the acoustic signals. The mapping engine 114 may employ an Independent Component Analysis (ICA) technique to separate the acoustic signals.

At block 410, the method 400 may include performing noise cancellation on each of the separated acoustic signal to obtain noise free acoustic signals. In an implementation, the mapping engine 114 may perform noise cancellation on each of the separated acoustic signal.

Further, at block 412, the method 400 may include mapping each noise free acoustic signal to respective source of sound to identify the primary acoustic signal. In an implementation, the mapping engine 114 may map each of the noise free acoustic signal to respective source of sound. In an example, the mapping may include cross-correlating each of the separated acoustic signal with a corresponding source.

In an example, the separated acoustic signals may be stored in a database that may be located within the voice communication system 100 or may be on a Cloud server. The separated acoustic signals may be utilized later for performing analysis regarding identifying an identity of different speakers, time of use of the voice communication system 100, and the like. The analysis of the acoustic signals may be employed in security authentication and communicating with banking systems, such as logging into banking, making payments, and adding or removing new payees using voice authentication.

Referring now to FIG. 5, at block 502, the method 500 may include receiving instructions to start a call. In an example, the instructions for starting a call may be understood as pressing of a telephone number by a user of the system 100. In an implementation, the audio engine 112 may receive instructions to start the call, such as an audio call. It is to be understood, the audio call may be a conference call or a regular phone call.

At block 504, the method 500 may include determining whether or not there are multiple speakers in the call. In an implementation, the audio engine 112 may determine the number of speakers in the call. If there are multiple speakers, the method 500 moves to block 510. If there is a single speaker, the method 500 moves to block 506.

At block 506, the method 500 includes proceeding with the call with a single speaker. In an example, the single speaker may be considered as a primary speaker. In an implementation, the audio engine 112 may identify the single speaker as the primary speaker.

At block 508, the method 500 includes determining whether the call is over or not. If the call is over, the method 500 goes to block 502 to receive instructions for another call. If the call is not yet over, the method 500 goes back to block 506. In an implementation, the audio engine 112 may be configured to monitor whether or not the call is over.

Further, at block 510, the method 500 may include obtaining a position and sound characteristics associated with the multiple speakers. In an implementation, the audio engine 112 may obtain the position and sound characteristics associated with the multiple speakers.

At block 512, the method 500 may include selecting the primary speaker from the multiple speakers based on the position and sound characteristics. In an implementation, the mapping engine 114 may select the primary speaker based on the position and sound characteristics of the multiple speakers.

At block 514, the method 500 may include determining whether the automatic call muting functionality is activated or not. In an implementation, the control engine 116 may determine whether a user of the system 100 has activated the automatic call muting functionality or not. In an example, if the user wishes to activate the automatic muting functionality, the user may press a specific key combination of the system 100. In another example, the user may activate the automatic muting functionality by an application on the communication device. If the automatic muting functionality is activated, the method 500 may proceed to block 516. On the other hand, if the automatic muting functionality is not activated, the method 500 may go to block 506.

At block 516, the method 500 may include automatically muting the system 100 to block audio signals to the call, such as a conference call, when the primary speaker is not speaking and un-muting the system 100, to provide audio signals to the call when the primary speaker is speaking. In an implementation, the control engine 116 may automatically mute or un-mute the system 100.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A voice communication system (100) comprising:
an audio engine (112), to,
cancel ambient noise from a plurality of acoustic signals, to obtain a first set of acoustic signals, the plurality of acoustic signals comprising a primary acoustic signal and the ambient noise;
determine a number of acoustic signals in the first set of acoustic signals and a geometric location of sound sources associated with the first set of acoustic signals, a sound source indicating an originating point of an acoustic signal; and
a mapping engine (114), to,
suppress noise from each of the first set of acoustic signals to obtain a noise free set of acoustic signals; and
identify the primary acoustic signal from amongst the noise free set of acoustic signals by mapping each noise free acoustic signal to a corresponding sound source.

2. The voice communication system (100) as claimed in claim 1, wherein the audio engine (112) is to receive the plurality of acoustic signals from at least a primary microphone (128-1) and a secondary microphone (128-2).

3. The voice communication system (100) as claimed in claim 2, wherein the audio engine (112) subtracts acoustic signals captured from the secondary microphone from the acoustic signals captured by the primary microphone, to obtain the first set of acoustic signals.

4. The voice communication system (100) as claimed in claim 1, wherein the audio engine (112) performs a cross-correlation based localization to determine the number of acoustic signals and the geometric location of sound sources.

5. The voice communication system (100) as claimed in claim 1, wherein the audio engine (112) is to perform Independent Component Analysis (ICA) on the first set of acoustic signals to separate each acoustic signal in the first set of acoustic signals.

6. The voice communication system (100) as claimed in claim 1, wherein the mapping engine (114) employs an algebraic aggregator technique to suppress the noise.

7. The voice communication system (100) as claimed in claim 1, wherein the mapping engine (114) is to perform cross-correlation to identify the primary acoustic signal from amongst the noise free set of acoustic signals.

8. A method for identifying a primary signal from a plurality of acoustic signals, the method comprising:
receiving, by a processor (102), the plurality of acoustic signals associated with the plurality of sources, the plurality of acoustic signals comprising the primary acoustic signal and ambient noise;
suppressing, by the processor (102), the ambient noise from the plurality of acoustic signals to obtain a first set of acoustic signals;
separating, by the processor (102), each of the acoustic signal from the first set of acoustic signals;
performing, by the processor (102), noise cancellation on each of the separated acoustic signal to obtain noise free acoustic signals; and
mapping, by the processor (102), each noise free acoustic signal to respective source of sound to identify the primary signal.

9. The method as claimed in claim 8, wherein the suppressing comprises filtering the plurality of acoustic signals based on an amplitude of the acoustic signals.

10. The method as claimed in claim 8, wherein the separating comprises performing a cross-correlation based localization to identify a number of sources of the acoustic signals and location coordinates of the sources of the acoustic signals.

11. The method as claimed in claim 8, wherein the separating is performed by an Independent Component Analysis (ICA) technique.

12. The method as claimed in claim 8, wherein the mapping comprises cross-correlating each of the separated acoustic signal with a corresponding source.

13. A non-transitory computer-readable medium having a set of computer readable instructions that, when executed, cause a processor (102) to,
filter a plurality of acoustic signals based on an amplitude;
suppress ambient noise from the plurality of acoustic signals to obtain a first set of acoustic signals;
perform a cross-correlation based localization to determine a number of acoustic signals and a number of sources associated with the first set of acoustic signals;
cancel noise from each of the first set of acoustic signals to obtain a noise free set of acoustic signals; and
map each noise free acoustic signal to respective source to identify a primary signal.

14. The non-transitory computer-readable medium as claimed in claim 13, wherein the processor (102) cross-correlates each of the noise free acoustic signal with a corresponding source to identify the primary signal.

* * * * *